United States Patent
Oyama et al.

(10) Patent No.: US 10,193,155 B2
(45) Date of Patent: Jan. 29, 2019

(54) MANUFACTURING CATHODE MATERIAL, CATHODE, AND LITHIUM ION BATTERY

(71) Applicant: SUMITOMO OSAKA CEMENT CO., LTD., Chiyoda-ku, Tokyo (JP)

(72) Inventors: Masataka Oyama, Tokyo (JP); Satoru Oshitari, Tokyo (JP); Ryuuta Yamaya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 265 days.

(21) Appl. No.: 14/643,462

(22) Filed: Mar. 10, 2015

(65) Prior Publication Data

US 2016/0093888 A1 Mar. 31, 2016

(30) Foreign Application Priority Data

Sep. 29, 2014 (JP) ................................. 2014-197829

(51) Int. Cl.
*H01M 4/58* (2010.01)
*C01B 25/45* (2006.01)
(Continued)

(52) U.S. Cl.
CPC ......... *H01M 4/5825* (2013.01); *C01B 25/451* (2013.01); *H01M 4/366* (2013.01);
(Continued)

(58) Field of Classification Search
None
See application file for complete search history.

(56) References Cited

U.S. PATENT DOCUMENTS

2003/0064290 A1* 4/2003 Li ........................... C01B 25/45
429/231.95
2006/0099495 A1 5/2006 Suzuki et al.
(Continued)

FOREIGN PATENT DOCUMENTS

CA 2566906 A1 4/2008
DE 102012000914 B4 11/2012
(Continued)

OTHER PUBLICATIONS

European Search Report for European Patent Application No. 15153921.0 (dated Apr. 28, 2015).
(Continued)

*Primary Examiner* — Wyatt P McConnell
(74) *Attorney, Agent, or Firm* — Merchant & Gould P.C.

(57) ABSTRACT

A cathode material which does not easily deteriorate when used in batteries, a method for producing cathode materials, a cathode, and a lithium ion battery are provided. A cathode material including a cathode active material, in which the cathode active material is expressed by $Li_{1+x}A_yD_zPO_4$ (here, A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq 1$), and, in thermogravimetric analysis in an inert gas atmosphere, when a temperature is increased in a temperature range from 100° C. to 300° C. at a temperature-increase rate of 10° C./minute, a weight loss ratio in the temperature range is 0.3% by weight or less.

8 Claims, 1 Drawing Sheet

(51) Int. Cl.
  *H01M 4/36*  (2006.01)
  *H01M 10/0525*  (2010.01)
  *H01M 4/62*  (2006.01)
  H01M 10/052  (2010.01)
  H01M 4/02  (2006.01)

(52) U.S. Cl.
  CPC ....... *H01M 4/625* (2013.01); *H01M 10/0525* (2013.01); *H01M 4/623* (2013.01); *H01M 10/052* (2013.01); *H01M 2004/028* (2013.01); *H01M 2220/20* (2013.01); *H01M 2220/30* (2013.01)

(56) References Cited

U.S. PATENT DOCUMENTS

| | | |
|---|---|---|
| 2010/0297496 A1 | 11/2010 | Ravet et al. |
| 2012/0058397 A1 | 3/2012 | Zhamu et al. |

FOREIGN PATENT DOCUMENTS

| | | |
|---|---|---|
| EP | 1339119 A | 8/2003 |
| EP | 2413402 A1 | 2/2012 |
| EP | 2683007 A1 | 1/2014 |
| JP | A-2000-509193 | 7/2000 |
| JP | A-2001-307726 | 11/2001 |
| JP | A-2002-358965 | 12/2002 |
| JP | A-2004-095385 | 3/2004 |
| JP | A-2009-004371 | 1/2009 |
| JP | A-2010-510631 | 4/2010 |
| WO | WO 97/40541 A1 | 10/1997 |
| WO | WO 2008/061174 A2 | 5/2008 |
| WO | WO 2013/177671 A1 | 12/2013 |

OTHER PUBLICATIONS

Japanese Office Action for corresponding Japanese Patent Application No. 2014-197829 (dated Jan. 20, 2015).

* cited by examiner

MANUFACTURING CATHODE MATERIAL, CATHODE, AND LITHIUM ION BATTERY

This application claims benefit of Serial No. 2014-197829, filed 29 Sep. 2014 in Japan and which application is incorporated herein by reference. To the extent appropriate, a claim of priority is made to the above disclosed application.

TECHNICAL FIELD

The present invention relates to a cathode material, a method for producing cathode materials, a cathode, and a lithium ion battery.

BACKGROUND ART

Studies are underway regarding secondary batteries used in portable electronic devices and hybrid vehicles. As typical secondary batteries, lead storage batteries, alkali storage batteries, lithium ion batteries, and the like are known. Among a variety of secondary batteries, lithium secondary batteries in which a lithium ion battery is used have advantages of high output, high energy density, and the like.

As a cathode material used for lithium ion batteries, phosphate which includes Li and transition metals and have an olivine structure is known (for example, refer to Japanese Laid-open Patent Publication (Translation of PCT Application) No. 2000-509193). As a method for producing phosphate described above, a production method by a synthesis method (hydrothermal synthesis method) in which a hydrothermal reaction is used is known (for example, refer to Japanese Laid-open Patent Publication No. 2004-95385). When the hydrothermal synthesis reaction described in Japanese Laid-open Patent Publication No. 2004-95385 is used, it is possible to easily synthesize particles having aligned directions of the crystal growth of the obtained phosphate, and it also becomes possible to control the particle diameter and the particle shape.

DISCLOSURE OF THE INVENTION

In the hydrothermal synthesis method described in Japanese Laid-open Patent Publication No. 2004-95385, when synthesis is carried out under conditions in which phosphate is generated in a relatively gentle manner, the particle growth in the obtained phosphate is suppressed, and it is possible to produce particles of cathode active materials having a small particle diameter and a large specific surface area. In such cathode active materials, the lithium diffusion path in the crystals is shortened, the output power is increased, and the cathode active materials have high performance.

On the other hand, when synthesis is carried out under gentle reaction conditions, raw materials, unreacted substances such as intermediate products, or impurities are likely to remain. For example, $A_3(PO_4)_2$ (A represents a transition metal) is known to include water of crystallization (water of constitution). When $A_3(PO_4)_2$ including water of crystallization (water of constitution) is included in cathode materials, gas is generated due to the decomposition of the water of crystallization (water of constitution) or acids (for example, HF) are generated due to the reaction between the water of crystallization (water of constitution) and an electrolytic solution when a voltage is applied to batteries for which the above-described cathode materials are used, and accordingly, there is a concern that the cycle characteristics of the batteries may deteriorate.

The above-described disadvantage does not occur only in cathode materials produced using the hydrothermal reaction. Even in a case in which cathode materials are produced using a liquid phase method such as a sol-gel method or a coprecipitation method, or are produced at a low temperature using a solid-phase method, it is difficult to fully remove unreacted substances or impurities, unreacted substances or impurities including water of crystallization (water of constitution) derived from raw materials remain, and thus the same problem may occur.

The present invention has been made in consideration of the above-described circumstance, and an object of the present invention is to provide a cathode material which does not easily deteriorate when used in batteries. In addition, another object is to provide a method for producing cathode materials in which the above-described cathode active material may be easily produced. Still another object is to provide a cathode including the above-described cathode material or a cathode material obtained using the method for producing cathode materials, and a lithium ion battery including the above-described cathode.

In order to solve the above-described problem, according to a first aspect of the present invention, there is provided a cathode material including a cathode active material, in which the cathode active material is expressed by $Li_{1+x}A_yD_zPO_4$ (here, A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq 1$), and, the cathode material has a weight loss ratio of 0.3% by weight or less, wherein the weight loss ratio is measured in a thermogravimetric analysis, which is carried out in an inert gas atmosphere; and a temperature is kept at 100° C. for 30 minutes, increased from 100° C. to 300° C. at a temperature-increase rate of 10° C./minute and then kept at 300° C. for 30 minutes.

According to the first aspect of the present invention, the cathode material may include active material particles which is formed of the cathode active material and a carbonaceous material which presents on surfaces of the active material particles.

According to the first aspect of the present invention, the cathode material may include water of crystallization at ratio of 0.3% by weight or less with respect to the cathode material. It is preferable that the ratio is 0.03% by weight or less.

According to the first aspect of the present invention, a P/(A+D) molar ratio of the cathode material is at a range from 1.00 to 1.05, wherein the P/(A+D) molar ratio is measured by using a ICP atomic emission spectroscopy. And it is preferable that the range is from 0.998 to 1.04, and it is more preferable that the range is from 1.0 to 1.03.

According to a second aspect of the present invention, there is provided a method for producing cathode materials including a cathode active material expressed by $Li_{1+x}A_yD_zPO_4$ (here, A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq 1$), including steps of obtaining a composite which is an active material or a precursor of the active material by heating a dispersion liquid obtained by dispersing a lithium salt, a metal salt containing A, a metal salt containing D or a compound containing D, and a phosphate compound in a dispersion medium in a pressure resistant vessel; measuring a molar ratio of the phosphorous to a sum of the metal elements represented by A and the metal elements represented by D, wherein the metal elements represented by A, metal elements represented by D, and the phosphorous are included in the composite; obtaining a mixture by adding a subsidiary material containing phosphorous and Li to the composite on the basis of measurement results; and firing the mixture, in which, in the step of obtaining the mixture, the subsidiary material is added on the basis of the measurement results so that the molar ratio of the phosphorous to the sum of the metal elements represented by A and the metal elements represented by D in the mixture reaches 1 or more, and the subsidiary material has a molar ratio between Li and phosphorous of 3:1.

According to the second aspect of the present invention, the subsidiary material may be $Li_3PO_4$.

According to the second aspect of the present invention, in the firing step, the mixture may be fired after an organic compound is further added to the mixture.

According to a third aspect of the present invention, there is provided a cathode including the above-described cathode material or a cathode material produced using the above-described method for producing cathode materials.

According to a fourth aspect of the present invention, there is provided a lithium ion battery including the above-described cathode.

According to the present invention, it is possible to provide a cathode material which does not easily deteriorate when used in batteries. In addition, it is possible to provide a method for producing cathode materials in which the above-described cathode material is easily produced. Furthermore, it is possible to provide a cathode including the above-described cathode material or a cathode material obtained using the method for producing cathode materials, and a lithium ion battery including the above-described cathode.

DETAILED DESCRIPTION OF THE INVENTION

Cathode Material

Figure 1A:
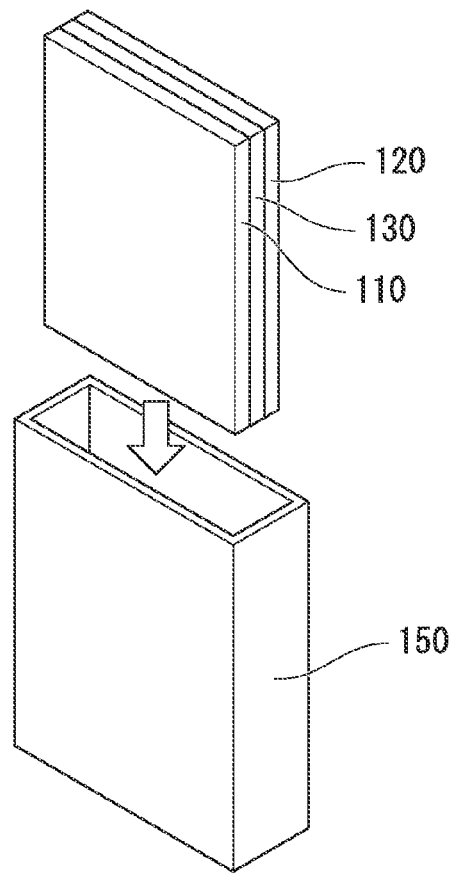
FIG. 1A is a schematic view illustrating an example of a cathode and an example of a lithium ion battery according to the present embodiment.

A cathode material of the present embodiment is a cathode material including a cathode active material, in which the cathode active material is expressed by $Li_{1+x}A_yD_zPO_4$ (here, A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq 1$), and, the cathode material has a weight loss ratio of 0.3% by weight or less, wherein the weight loss ratio is measured in a thermogravimetric analysis (TGA), which is carried out in an inert gas atmosphere; and a temperature is kept at 100° C. for 30 minutes, increased from 100° C. to 300° C. at a temperature-increase rate of 10° C./minute and then kept at 300° C. for 30 minutes.

The rare earth elements refer to 15 elements of La, Ce, Pr, Nd, Pm, Sm, Eu, Gd, Tb, Dy, Ho, Er, Tm, Yb, and Lu which belong to the lanthanum series.

A is preferably Co, Mn, Ni, or Fe. D is preferably Mg, Ca, Sr, Ba, Ti, Zn, and Al. In a case in which the cathode active material contains the above-described elements, it is possible to make cathode materials capable of realizing a high discharge potential and high stability. The above-described elements are preferable selective materials due to their abundant reserves.

In the cathode material of the present embodiment, the cathode active material is in a particle form. Hereinafter, in some cases, particles formed of the cathode active material will be referred to as "active material particles".

There is no particular limitation regarding the size of the active material particles, but the average particle diameter of primary particles is preferably in a range of 0.01 µm to 2 µm, and more preferably in a range of 0.02 µm to 0.5 µm.

When the average particle diameter of the primary particles of the active material particles is 0.01 µm or more, it is possible to sufficiently coat the surfaces of the primary particles with a carbonaceous film, the discharge capacity at a high charge-discharge rate does not easily decrease, and it becomes possible to realize sufficient charge and discharge rate performance, which are preferable.

When the average particle diameter of the primary particles of the active material particles is 2 µm or less, there is no case in which the internal resistance of the primary particles becomes excessively great, and it is possible to sufficiently ensure the discharge capacity at a high charge-discharge rate, which are preferable.

The shape of the active material particle is not particularly limited, but is preferably spherical, particularly, truly spherical.

When the shape of the active material particle is spherical, it is possible to reduce the amount of a solvent when paste for cathodes is prepared by mixing the active material particles, a binder resin (binding agent), and a solvent together, and the application of the paste for cathodes to collectors becomes easy, which are preferable.

In addition, when the shape of the active material particle is spherical, the surface area of the active material particle is minimized, and it is possible to minimize the amount of the binder resin blended when the binder resin (binding agent) is added to the cathode material. When the amount of the binder resin added is decreased, it is possible to decrease the internal resistance of cathodes to be obtained, which is preferable.

Furthermore, when the shape of the active material particle is spherical, the active material particles is easily close-packed, and thus the amount of the cathode material packed per unit volume increases. As a result, the electrode density may be increased, and it is possible to increase the capacity of lithium ion batteries, which is preferable.

The active material particle preferably has a carbonaceous material on the surface. The carbonaceous material refers to a carbon single body or a carbon material including carbon as a main component.

"Having the carbonaceous material on the surface" means any one or more states of (i) a state in which the surfaces of the active material particles are coated with a coat (carbonaceous film) made of a carbonaceous material, (ii) a state in which a plurality of particles made of a carbon single body or particles made of a carbon material including carbon as a main component is attached or bonded to the surfaces of the active material particles, and (iii) a state in which a plurality of agglomerates formed by agglomerating a plurality of particles made of a carbon single body or particles made of a carbon material including carbon as a main component is attached or bonded to the surfaces of the active material particles.

Hereinafter, in some cases, "the active material particles having a carbonaceous material on the surface" exhibiting the (i) to (iii) states will be referred to as composite particles.

The above-described state also includes a state in which any one or more of the particles made of a carbon single body, the particles made of a carbon material including carbon as a main component, and the agglomerates formed by agglomerating a plurality of the particles are present between the composite particles.

The coating proportion of the surfaces of the active material particles with the carbonaceous material is preferably 60% or more, and more preferably 80% or more. The coating proportion may be measured using a transmission electron microscope (TEM), an energy dispersive X-ray spectrometer (EDX), or the like.

When the coating proportion by the carbonaceous material is 60% or more, it becomes possible to uniformly cause reactions of the insertion and removal of lithium ions throughout all the surfaces of the active material particles when the cathode material of the present embodiment is used as a material for lithium ion batteries.

When the coating proportion by the carbonaceous material is 60% or more, moisture is not easily adsorbed to the surfaces of the active material particles, and it is possible to suppress any disadvantages causing the breakage of batteries such as the deterioration of battery components due to hydrofluoric acid generated by a reaction between moisture and an electrolytic solution and an increase in the internal pressure of battery packages caused by the generation of gas due to the decomposition of water during charging and discharging.

The content rate of oxygen in the carbonaceous material on the composite particle is preferably 5.0% by mass or less, and more preferably 3.0% by mass or less.

"The content rate of oxygen" refers to the amount (% by mass) of oxygen atoms included in all the carbonaceous material. In the carbonaceous material, oxygen atoms are included in forms of a hydroxyl group, a carbonyl group, a carboxyl group, and a functional group such as an ether bond and an ester bond (hereinafter, in some cases, will be referred to as 'the oxygen-containing functional group').

The content of oxygen may be obtained by decomposing the cathode active material in the composite particles using a hydrochloric acid solution so as to obtain a carbonaceous material single body, then, washing the carbonaceous material single body using pure water, drying the carbonaceous material single body at 100° C. for two hours in a vacuum, and measuring the amount of oxygen in the obtained dried substance using an oxygen and nitrogen analyzer.

When the carbonaceous material has the oxygen-containing functional group, there is a concern that the internal pressure of battery packages may be increased due to gas generated from the oxygen-containing functional group during charging, and batteries may be broken. However, when the content rate of oxygen in the carbonaceous material is 5.0% by mass or less, the generation of gas is suppressed, and the breakage of batteries is easily suppressed, which are preferable.

When the content rate of oxygen in the carbonaceous material is 5.0% by mass or less, the adsorption of moisture to the oxygen-containing functional group in the carbonaceous material is suppressed, and it is possible to suppress the deterioration of battery components due to hydrofluoric acid generated by a reaction between moisture and an electrolytic solution, which is preferable.

The specific surface area of the composite particle is preferably in a range of 1 $m^2/g$ to 80 $m^2/g$, and more preferably in a range of 4 $m^2/g$ to 50 $m^2/g$.

When the specific surface area of the composite particle is 1 $m^2/g$ or more, it does not take a long period of time for lithium ions or electrons to migrate in the composite particles, the internal resistance does not easily increase, and the deterioration of the output characteristics may be suppressed, which is preferable.

On the other hand, when the specific surface area of the composite particle is 80 $m^2/g$ or less, the amount of carbon included in total mass of cathode material does not become excessive, and it is possible to suppress a decrease in the total charge and discharge capacity of the cathode material, which is preferable.

"The internal resistance" mentioned herein refers to the sum of, mainly, electron resistance and lithium ion migration resistance. The electron resistance is proportionate with the amount of carbon, the density and crystallinity of carbon, and the lithium ion migration resistance is inversely proportionate with the amount of carbon, the density and crystallinity of carbon.

As a method for assessing the internal resistance, for example, a current-rest method or the like is used. In the current-rest method, the internal resistance is measured as the sum of wiring resistance, contact resistance, charge migration resistance, lithium ion migration resistance, lithium reaction resistance at the positive and negative electrodes, interelectrode resistance determined by the distance between the positive and negative electrodes, resistance regarding the solvation and desolvation of lithium ions, and the solid electrolyte interface (SEI) migration resistance of lithium ions.

The content rate of carbon in the composite particles is preferably in a range of 0.3% by mass to 8.0% by mass, and more preferably in a range of 0.5% by mass to 5.0% by mass.

When the content rate of carbon in the composite particles is 0.3% by mass or more, the discharge capacity does not easily decrease at a high charge-discharge rate in a case in which batteries are formed, and it becomes possible to realize sufficient charge and discharge rate performance, which is preferable.

When the content rate of carbon in the composite particles is 8.0% by mass or less, the migration distance of lithium ions in carbon in which the diffusion rate of lithium ions is slow does not become excessively long, and thus it becomes possible to suppress voltage drop at a high charge-discharge rate at an ignorable level, which is preferable.

In thermogravimetric analysis in an inert gas atmosphere, when the temperature is increased in a temperature range from 100° C. to 300° C. at a temperature-increase rate of 10° C./minute, the cathode material of the present embodiment has a weight loss ratio in the temperature range of 0.3% by weight or less.

As the inert gas, for example, nitrogen or noble gas may be used.

The weight is decreased in thermogravimetric analysis by the thermal decomposition of impurities such as FeOOH, the desorption of oxygen or hydrogen from $LiMPO_4(OH)$, the evaporation of adsorbed water which is attached to the surfaces of highly wettable impurities and is not easily removed, and the like. The weight is decreased mainly by the evaporation of raw materials included in the cathode material, water of crystallization included in unreacted substances such as intermediate products, or water of crystallization included in impurities.

The complete prevention of unreacted substances or impurities including water of crystallization from remaining or the complete removal of water of crystallization included in reactants or impurities is preferred, but the complete prevention of the remaining of unreacted substances or impurities including water of crystallization is difficult in terms of industrial production. Therefore, in the present invention, attention is paid to the amount of water of crystallization remaining in unreacted substances or impurities or the influences thereof, and a cathode material that does not easily deteriorate is provided.

For the reduction of unreacted substances or impurities including water of crystallization and the reduction of water of crystallization included in reactants or impurities, there is a method in which a washing solution is used, the weight is decreased through high-temperature firing, and the like, and any method may be used to reduce the weight (reduce the mass).

In the cathode material having a weight loss ratio of 0.3% by weight or less, preferably, 0.03% by weight or less, only a small amount of water of crystallization is included, and thus, in batteries for which the cathode material is used, the generation of gas due to the decomposition of water of crystallization when a voltage is applied or the generation of acids (for example, HF) due to the reaction between water of crystallization and an electrolytic solution is suppressed, and it becomes possible to suppress the deterioration of battery components.

Therefore, according to the cathode material of the present embodiment, it is possible to provide a cathode material which does not easily deteriorate when used in batteries.

Method for Producing Cathode Materials

A method for producing cathode materials of the present embodiment is a method for producing cathode materials including a cathode active material expressed by $Li_{1+x}A_y D_zPO_4$ (here, A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq1$), including steps of obtaining a composite which is an active material or a precursor of the active material by heating a dispersion liquid obtained by dispersing a lithium salt, a metal salt containing A, a metal salt containing D or a compound containing D, and a phosphate compound in a dispersion medium in a pressure resistant vessel;

measuring a molar ratio of the phosphorous to a sum of the metal elements represented by A and the metal elements represented by D, wherein the metal elements represented by A, metal elements represented by D, and the phosphorous are included in the composite;

obtaining a mixture by adding a subsidiary material containing phosphorous and Li to the composite on the basis of measurement results; and firing the mixture, wherein, in the step of obtaining the mixture, the subsidiary material is added on the basis of the measurement results so that the molar ratio of the phosphorous to the sum of the metal elements represented by A and the metal elements represented by D in the mixture reaches 1 or more, and the subsidiary material has a molar ratio between Li and phosphorous of 3:1.

Step of Obtaining a Composite

First, the dispersion liquid obtained by dispersing a lithium salt, a metal salt containing A, a metal salt containing D or a compound containing D, and a phosphate compound in a dispersion medium is prepared.

Examples of the lithium salt include lithium acetate ($LiCH_3COO$), lithium chloride (LiCl), lithium hydroxide (LiOH), and the like.

As the metal salt containing A, it is possible to use a divalent halide, hydrosulfate, nitrate, acetate, and the like.

As the metal salt containing D, it is possible to use a halide, hydrosulfate, nitrate, acetate, and the like.

As the compound containing D, it is possible to use $MgCl_2$, $MgSO_4$, $AlCl_3$, $Al(CH_3CO_2)_3$, and the like.

Examples of the phosphate compound include phosphoric acid ($H_3PO_4$), ammonium dihydrogen phosphate ($NH_4H_2PO_4$), diammonium hydrogen phosphate (($NH_4)_2HPO_4$), and the like.

Each component may be singly used, or two or more kinds of the element may be jointly used.

Examples of the dispersion medium that may be used include polar organic solvents such as water, alcohols, ethers, acetonitrile, tetrahydrofuran, and dimethyl sulfoxide, solution mixtures including the polar organic solvents, liquefied gas, and the like. While there is no particular limitation, water is preferred due to its small environmental load, low price, and safety. In addition, since water has permittivity significantly changing near the critical point, it is possible to easily control solvent properties such as solubility in individual substances through the operation of temperature and pressure, and the control of the reaction conditions is easy.

Next, the prepared dispersion liquid is put into a pressure resistant vessel, is heated to a predetermined temperature, and is reacted for a predetermined period of time (hydrothermal reaction).

The reaction conditions are appropriately selected depending on the kind of the solvent or substances being synthesized; however, in a case in which the solvent is water, the heating temperature is preferably in a range of 80° C. to 900° C., and the reaction time is preferably in a range of 0.5 hours to 24 hours. When the reaction is caused in a sealed pressure resistant vessel, the pressure at this time falls in a range of 0.1 MPa to 100 MPa. In a case in which the solvent is water, the heating temperature is preferably in a range of 80° C. to 374° C., and the pressure at this time falls in a range of 0.1 MPa to 22 MPa. The heating temperature is more preferably in a range of 100° C. to 350° C., and the reaction time is more preferably in a range of 0.5 hours to 5 hours, and the pressure at this time falls in a range of 0.1 MPa to 17 MPa.

After that, the temperature is decreased, and the obtained reaction product is washed using water, whereby an active material or a precursor of the active material is obtained in a composite form. Hereinafter, in some cases, the obtained "active material or precursor of the active material" will be referred to simply as "the composite".

Measurement Step

Next, for the metal elements represented by A, the metal elements represented by D, and phosphorous included in the composite, the molar ratio of phosphorous to the sum of the metal elements represented by A and the metal elements represented by D is measured. "The molar ratio of phosphorous to the sum of the metal elements represented by A and the metal elements represented by D" is measured through ICP atomic emission spectroscopy.

In the following description, "the sum of the metal elements represented by A and the metal elements represented by D" will be referred to as "the total metal amount of A and D" to facilitate the description.

Step of Obtaining a Mixture

Next, a subsidiary material containing phosphorous and Li is added to the composite, thereby obtaining a mixture.

At this time, on the basis of the measurement results in the above-described step, the amount of phosphorous necessary for the molar ratio of phosphorous to the total metal amount of A and D included in the mixture to reach 1 or more is computed. The amount of the subsidiary material added to the composite is controlled on the basis of the computation results so that the molar ratio of phosphorous to the total metal amount of A and D in the mixture reaches 1 or more.

The subsidiary material being added has a molar ratio between Li and phosphorous of 3:1.

In a method such as washing, it is difficult to remove a metal compound including the metal element represented by A (metal compound A) and a metal compound including the metal element represented by D (metal compound D). In addition, water of crystallization included in the metal compound A and the metal compound D cause a problem in terms of battery performance. Therefore, even when a phosphorous compound or a Li compound is excessively included in the cathode material to be obtained, it is preferable to preferentially reduce the metal compound A and the metal compound D.

The subsidiary material may be a mixture of a Li compound and a phosphorous compound, or may be a compound containing Li and phosphorous.

As the Li compound, LiOH, LiCl, LiCH$_3$COO, Li$_2$CO$_3$, or the like is preferably used. As the phosphorous compound, H$_3$PO$_4$, (NH$_3$)H$_2$PO$_4$, (NH$_4$)$_2$HPO$_4$, or the like is preferably used.

Particularly, it is preferable to add Li$_3$PO$_4$ having a molar ratio between Li and phosphorous of 3:1 which does not generate other impurities. An amount of Li$_3$PO$_4$ is preferably added so that the molar ratio of phosphorous to the total metal amount of A and D in the fired active material falls in a range of 1 to 1.03. The molar ratio of phosphorous included is preferably 1 or more in order to sufficiently remove crystalline water, and the molar ratio is preferably 1.03 or less since an excessive amount of Li$_3$PO$_4$ leads to a decrease in the battery capacity.

An organic compound generating a carbonaceous material that covers the surface of the cathode active material during firing may be mixed with the above-described mixture. Examples of the organic compound include polyvinyl alcohol, polyvinyl pyrrolidone, cellulose, starch, gelatin, carboxymethyl cellulose, methyl cellulose, hydroxylmethyl cellulose, hydroxylethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, divalent alcohols, trivalent alcohols, and the like.

Regarding the blending ratio between the composite and the organic compound, when the total amount of the organic compound is converted to the amount of carbon, the content rate of carbon in the composite particles is preferably in a range of 0.3% by mass to 8.0% by mass, and more preferably in a range of 0.5% by mass to 5.0% by mass.

The above-described composite, Li$_3$PO$_4$, and the organic compound are dissolved or dispersed in the dispersion medium, thereby preparing a homogeneous slurry. During the dissolution or dispersion, the addition of a dispersant is preferred.

The method for dissolving or dispersing the composite, Li$_3$PO$_4$, and the organic compound in the dispersion medium is not particularly limited as long as the composite is dispersed, and Li$_3$PO$_4$ and the organic compound are dissolved or dispersed. For example, it is preferable to use a medium stirring-type disperser that stirs medium particles at a high speed such as a planetary ball mill, a vibration ball mill, a bead mill, a paint shaker, or an attritor.

In addition, the surface of the composite may be modified using a surface modifier. The surface modifier is not particularly limited, and examples thereof include silane coupling agents, titanium acid-based coupling agents, phosphoric acid-based coupling agents, carboxylic acid-based coupling agents, surfactants, and the like. The modification of the surface enables the prevention of the organic compound from scattering from the surface of the composite when the slurry obtained by mixing the composite, Li$_3$PO$_4$, the organic compound, and the dispersion medium is sprayed and dried in the atmosphere.

The amount of the surface modifier added to modify the surface of the composite is preferably in a range of 0.1% by mass to 20% by mass with respect to the composite.

When the amount of the surface modifier added is 0.1% by mass or more with respect to the composite, the surface of the composite may be sufficiently modified.

When the amount of the surface modifier added is 20% by mass or less with respect to the composite, the proportion of the surface modifier remaining in the cathode material to be obtained does not become excessive, and it is possible to suppress a decrease in the charge and discharge capacity per unit mass.

Firing Step

Next, the slurry is sprayed and dried in a high-temperature atmosphere, for example, in the atmosphere at a temperature in a range of 70° C. to 250° C.

Next, the dried substance was fired in a non-oxidative atmosphere. The non-oxidative atmosphere is preferably an inert atmosphere of nitrogen (N$_2$), argon (Ar), or the like.

In the hydrothermal reaction, A$_3$(PO$_4$)$_2$ that is an unreacted substance including the main raw materials of A and phosphorous which is not be easily removed using a method such as washing and are most contained as impurities is likely to remain. Since A$_3$(PO$_4$)$_2$ contains crystalline water, in the cathode material in which A$_3$(PO$_4$)$_2$ remains, there is a concern that disadvantages such as the deterioration or breakage of battery components and the degradation of battery characteristics caused by the water of crystallization contained in A$_3$(PO$_4$)$_2$ may occur.

Therefore, in the production method of the present embodiment, a reaction of the remaining A$_3$(PO$_4$)$_2$ and Li$_3$PO$_4$ described below is caused by firing the obtained mixture. Therefore, A$_3$(PO$_4$)$_2$ is easily removed. In addition, since the active material is synthesized due to the reaction, battery performance improves.

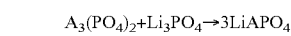

$$A_3(PO_4)_2 + Li_3PO_4 \rightarrow 3LiAPO_4$$

The firing temperature is preferably in a range of 500° C. to 1000° C., and more preferably in a range of 600° C. to 900° C. In addition, the firing time is preferably in a range of 0.1 hours to 40 hours.

When the firing temperature is 500° C. or higher, the organic compound contained in the dried substance is sufficiently decomposed and reacted, and thus the organic compound is sufficiently carbonized, and consequently, the high-resistance decomposed substance of the organic compound does not easily remain in the obtained agglomerate, which is preferable.

When the firing temperature is 1000° C. or lower, Li in the cathode active material does not easily evaporate, and thus the composition of the cathode active material does not easily deviate, and grains of the cathode active material do not easily grow. As a result, the discharge capacity at a high charge-discharge rate does not easily decrease, and sufficient charge and discharge rate performance may be realized, which are preferable.

In the firing step, the particle size distribution of the obtained agglomerate may be controlled by appropriately adjusting conditions for firing the dried substance, for example, the temperature-increase rate, the peak holding temperature, the holding time, and the like.

The method for producing cathode active materials of the present embodiment is as described below.

According to the above-described production method, it becomes possible to easily produce cathode materials in which the amount of unreacted substances included in the active material particles is reduced and disadvantages do not easily occur when the cathode materials are used as materials for batteries.

Cathode and Lithium Ion Battery

FIG. 1 is a schematic view illustrating an example of a cathode and an example of a lithium ion battery according to the present embodiment. The drawing illustrates a square lithium ion battery 100. The lithium ion battery 100 includes a cathode 110, a negative electrode 120, a separator 130, terminals 140, a housing 150, and a lid 160. The lithium ion battery 100 has a so-called stacked constitution.

The cathode 110 is a cathode according to the present embodiment, and includes the above-described cathode material or a cathode material produced using the above-described method for producing cathode materials. The drawing illustrates members having a square shape when seen in a planar view.

In order to produce the cathode of the present embodiment, paint for forming the cathode or paste for forming the cathode is prepared by mixing the above-described cathode material or a cathode material produced using the above-described method for producing cathode materials, a binding agent made of a binder resin, and a solvent. At this time, a conductive auxiliary agent such as carbon black may be added as necessary.

As the binding agent, that is, the binder resin, for example, a polytetrafluoroethylene (PTFE) resin, a polyvinylidene fluoride (PVdF) resin, fluororubber, or the like is preferably used.

The blending ratio between the cathode material and the binder resin is not particularly limited, and for example, the amount of the binder resin is set in a range of 1 part by mass to 30 parts by mass, and preferably in a range of 3 parts by mass to 20 parts by mass with respect to 100 parts by mass of the cathode material.

Examples of the solvent used in the paint for forming the cathode or the paste for forming the cathode include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethylene ether; ketones such as acetone, methyl ethyl ketone (MEK), methyl isobutyl ketone (MIBK), acetylacetone, and cyclohexanone; amides such as dimethyl formamide, N,N-dimethyl acetoacetamide, and N-methyl pyrrolidone; glycols such as ethylene glycol, diethylene glycol, and propylene glycol; and the like. These solvents may be singly used, or a mixture of two or more solvents may be used.

Next, the paint for forming the cathode or the paste for forming the cathode is applied to one surface of a metal foil, and then is dried, thereby obtaining a metal foil having a coat made of a mixture of the cathode material and the binder resin formed on one surface.

Next, the coat is bonded by pressurization, and is dried, thereby producing a collector (cathode) having a cathode material layer on one surface of the metal foil.

Therefore, the cathode of the present embodiment is produced.

The negative electrode 120 is illustrated in the drawing as a member having a square shape when seen in a planar view. As the negative electrode 120, it is possible to use a negative electrode that is generally known to be used as a negative electrode for lithium ion batteries. For example, it is possible to use a negative electrode produced using a negative electrode material such as metallic Li, a carbon material, a Li alloy, or $Li_4Ti_5O_{12}$.

The separator 130 has functions of preventing the short circuit between the cathode 110 and the negative electrode 120 and containing and holding an electrolytic solution. As the separator 130, it is possible to use a separator that is generally known to be used as a separator for lithium ion batteries.

In the lithium ion battery 100, the terminals 140 are respectively connected to the cathode 110 and the negative electrode 120, and electrically connect the electrodes to an external device.

The housing 150 accommodates the cathode 110, the negative electrode 120, the separator 130, and the electrolytic solution, and is capable of employing a variety of shapes, for example, a cylindrical shape on the basis of the standards of batteries in addition to the square shape illustrated in the drawing.

The lid 160 seals the housing 150, and has the terminals 140 attached thereto.

Figure 1B:
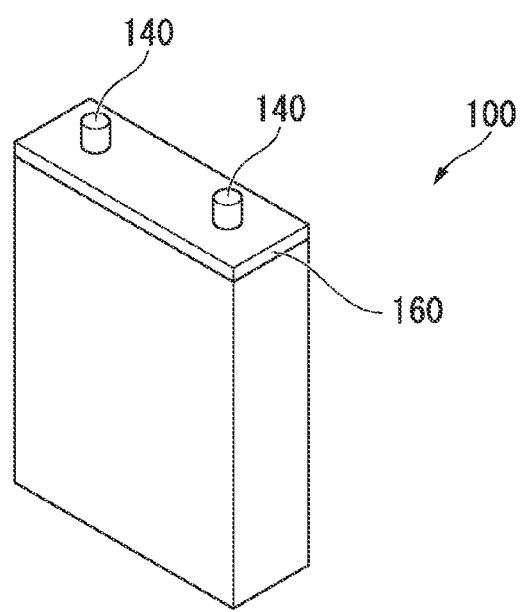
FIG. 1B illustrates an example of a lithium ion battery according to the present embodiment.

The above-described lithium ion battery 100 is produced by, first, pinching the separator 130 between the cathode 110 and the negative electrode 120, accommodating the components in the housing 150 (FIG. 1(a)), soaking the separator 130 with the electrolytic solution so as to dispose an electrolyte between the cathode 110 and the negative electrode 120, and sealing the housing 150 using the lid 160 having the terminals 140 respectively connected to the cathode 110 and the negative electrode 120 (FIG. 1(b)).

In the drawing, a set of the cathode 110, the negative electrode 120, and the separator 130 is accommodated in the housing 150, but it is also possible to alternatively dispose a plurality of cathodes and a plurality of negative electrodes, and dispose separators between the respective cathodes and the respective negative electrodes, thereby forming a stacked constitution.

In addition, instead of the electrolytic solution and the separator 130, a solid electrolyte may be used.

According to the cathode having the above-described constitution, since the cathode material of the present embodiment is included, cathodes which do not easily cause disadvantages when used in batteries and have excellent long-term reliability are obtained.

In addition, according to the lithium ion battery having the above-described constitution, since the cathode of the present embodiment is included, lithium ion batteries which do not easily cause disadvantages when used in batteries and have excellent long-term reliability are obtained.

Thus far, the preferred embodiments according to the present invention have been described with reference to the accompanying drawings, and it is needless to say that the present invention is not limited to the examples. The shapes, combinations, and the like of the respective components described in the examples are simply examples, and a variety of modifications based on design requirements and the like are allowed within the scope of the purpose of the present invention.

EXAMPLES

Hereinafter, the present invention will be described using examples, but the present invention is not limited to the examples.

Example 1

Production of Cathode Material

After 4 mol of lithium acetate ($LiCH_3COO$), 2 mol of manganese (II) sulfate ($MnSO_4$), and 2 mol of phosphoric acid ($H_3PO_4$) were mixed with 2 L (liters) of water, water was added so that the total amount reached 4 L, thereby preparing a homogeneous slurry-form mixture.

Next, the mixture was accommodated in a pressure resistant vessel having a capacity of 8 L, and was hydrothermally synthesized at 200° C. for 1 hour.

Subsequently, the obtained sediment was washed using water, thereby obtaining a cake-form precursor.

Next, for the precursor, the P/Mn ratio was measured through ICP atomic emission spectroscopy. The amount of $Li_3PO_4$ added to 150 g (in terms of solid) of the precursor computed on the basis of the measured P/Mn ratio was 7.4 g (6 mol % with respect to Mn).

Subsequently, the full amount of an aqueous solution of polyvinyl alcohol obtained by dissolving 150 g (in terms of solid) of the precursor, 47.4 g of $Li_3PO_4$, and 20 g of polyvinyl alcohol in 200 g of water was injected into a ball mill, furthermore, 500 g of zirconia balls having a diameter of 5 mm were injected as medium particles, and a dispersion treatment was carried out.

Next, the obtained slurry was sprayed in the atmosphere at 180° C., and was dried, thereby obtaining a dried substance.

Subsequently, the obtained dried substance was fired in a nitrogen atmosphere at 700° C. for 0.5 hours, thereby obtaining a cathode material of Example 1.

Assessment of the Cathode Material

Thermogravimetric analysis was carried out on the obtained cathode material using the following method.

(1) Thermogravimetric Analysis (TGA)

The thermogravimetric analysis was carried out using a thermogravimetric analysis device (Thermo plus EVO differential thermogravimetric analyzer TG8120, manufactured by Rigaku Corporation) under the following conditions.

Measurement Conditions

Specimen amount: 15 mg

Temperature-increase rate: 10° C./minute

Atmosphere: $N_2$

Gas flow rate: 200 ml/minute

Measurement temperature range: room temperature→100° C.→holding for 30 minutes→300° C.→-holding for 30 minutes Production of Lithium Ion Battery The obtained cathode material, polyvinylidene fluoride (PVdF) as a binder, and acetylene black (AB) as a conductive auxiliary agent were mixed together so that the mass ratio reached 90:5:5, and furthermore, N-methyl-2-pyrrolidone (NMP) was added as a solvent so as to impart fluidity, thereby producing a slurry.

Next, the slurry was applied on a 15 μm-thick aluminum (Al) foil, and was dried. After that, the aluminum foil was pressurized at a pressure of 600 kgf/cm², and a cathode was produced.

A lithium metal was disposed as a negative electrode with respect to the cathode of a lithium ion battery, and a separator made of porous polypropylene was disposed between the cathode and the negative electrode, thereby producing a battery member.

Meanwhile, ethylene carbonate and diethyl carbonate were mixed together at (a mass ratio of) 1:1, and furthermore, 1 M of a $LiPF_6$ solution was added, thereby producing an electrolyte solution having lithium ion conductivity.

Next, the battery member was immersed in the electrolyte solution, thereby producing a lithium ion battery of Example 1.

Assessment of Lithium Ion Battery

The produced lithium ion battery was assessed using the following method.

(1) Initial Capacity

First, the lithium ion battery was constant-current-charged at a 0.1 C rate up to 4.3 V in a 25° C. constant-temperature bath, and then was constant-voltage-charged until the current value of a 0.01 C rate was reached.

After that, the capacity when the lithium ion battery was constant-current-discharged at a 0.1 C rate to 2.0 V in a 25° C. constant-temperature bath was considered as the initial capacity.

(2) Cycle Characteristics

After the lithium ion battery was constant-current-charged at a 1 C rate up to 4.3 V in a 60° C. constant-temperature bath, the lithium ion battery was constant-voltage-charged until the current value of a 0.1 C rate was reached, and then was constant-current-discharged at a 1 C rate to 2.0 V. The above-described processes formed 1 cycle, and the cycle was repeated 300 times. The proportion of the capacity when the lithium ion battery was constant-current-discharged at a 1 C rate to 2.0 V at the $300^{th}$ cycle in the capacity to the capacity when the lithium ion battery was constant-current-discharged at a 1 C rate to 2.0 V at the first cycle was considered as the value of the cycle characteristics (%).

Example 2

A cathode material and a lithium ion battery of Example 2 were obtained in the same manner as in Example 1 except for the fact that 4.6 g (4 mol % with respect to Mn) of $Li_3PO_4$ was added.

Comparative Example 1

A cathode material and a lithium ion battery of Comparative Example 1 were obtained in the same manner as in Example 1 except for the fact that $Li_3PO_4$ was not added.

Comparative Example 2

A cathode material and a lithium ion battery of Comparative Example 2 were obtained in the same manner as in Example 1 except for the fact that 3.5 g (3 mol % with respect to Mn) of $Li_3PO_4$ was added.

The assessment results are described in Table 1. In the assessment, the lithium ion batteries having cycle characteristics exceeding 70% were determined to be favorable products, and the lithium ion batteries having cycle characteristics of 70% or less were determined to be poor products.

TABLE 1

| | Amount of Li$_3$PO$_4$ added (mol % vs. Mn) | P/Mn ratio of precursor | P/Mn ratio after firing | Weight decrease 100° C. to 300° C. (% by weight) | Initial capacity (mAh/g) | Cycle characteristics (%) | Assessment |
|---|---|---|---|---|---|---|---|
| Example 1 | 6 | 0.96 | 1.02 | 0.03 | 151 | 85 | Favorable |
| Example 2 | 4 | 0.96 | 1.00 | 0.28 | 150 | 74 | Favorable |
| Comparative Example 1 | 0 | 0.96 | 0.96 | 0.60 | 146 | 62 | Poor |
| Comparative Example 2 | 3 | 0.96 | 0.99 | 0.32 | 149 | 70 | Poor |

As a result of the assessment, it was found that the lithium ion batteries for which the cathode materials of the examples were used had more favorable cycle characteristics than the lithium ion batteries for which the cathode material of the comparative examples were used. That is, it could be confirmed that the lithium ion batteries did not easily cause disadvantages and had excellent long-term reliability, and that the present invention is effective.

DESCRIPTION OF REFERENCE NUMERALS AND SIGNS

100 LITHIUM ION BATTERY
110 CATHODE
120 NEGATIVE ELECTRODE
130 SEPARATOR
140 TERMINAL
150 HOUSING
160 LID

The invention claimed is:

1. A cathode material including a cathode active material, wherein the cathode active material is expressed by Li$_{1+x}$A$_y$D$_z$PO$_4$, wherein A represents one or more metal elements selected from the group consisting of Co, Mn, Ni, Fe, Cu, and Cr, D represents one or more metal elements selected from the group consisting of Mg, Ca, Sr, Ba, Ti, Zn, B, Al, Ga, In, Si, Ge, Sc, Y, and rare earth elements, $0<x<1$, $0<y<1$, $0\leq z<1.5$, and $0.9<y+z\leq 1$, and when a temperature of the cathode material is raised to a temperature range of 100° C. to 300° C. at a temperature-increase rate of 10° C/min, a weight loss ratio in the temperature range due to evaporation of water of crystallization is 0.03% by weight to 0.3% by weight, wherein the weight loss ratio is measured in a thermogravimetric analysis, which is carried out under the following measurement conditions using a differential thermogravimetric analyzer:

specimen amount: 15 mg
temperature-increase rate: 10° C. /minute
atmosphere: N2
gas flow rate: 200 ml/minute
measurement temperature range: 100 to 300° C.

2. The cathode material according to claim 1, wherein the cathode material comprises active material particles which is formed of the cathode active material and a carbonaceous material which presents on surfaces of the active material particles.

3. The cathode material according to claim 1, wherein the cathode material comprises water of crystallization at ratio of 0.3% by weight or less with respect to the cathode material.

4. The cathode material according to claim 1, wherein a P/(A+D) molar ratio of the cathode material is at a range from 1.00 to 1.05, wherein the P/(A+D) molar ratio is measured by using a ICP atomic emission spectroscopy.

5. A cathode comprising the cathode material according to claim 1.

6. A lithium ion battery comprising:
the cathode according to claim 5.

7. The cathode material according to claim 1, wherein the cathode material further comprises an impurity which comprises adsorbed water or water of crystallization, wherein the impurity is from raw material of the cathode material or from intermediate products.

8. The cathode material according to claim 7, wherein the impurity is a compound expressed by A$_3$(PO$_4$)$_2$, wherein A represents one or more metal elements selected from the group consisting of Co, Mn, Ni, Fe, Cu, and Cr.

* * * * *